Sept. 7, 1965   W. B. WILKINS   3,205,108
METHOD AND APPARATUS FOR MAKING WOUND TUBULAR ARTICLES
OF VARYING CROSS-SECTION
Filed May 17, 1962   3 Sheets-Sheet 1

INVENTOR.
WILLIAM B. WILKINS
BY
*Henry Kozak*
ATTORNEY

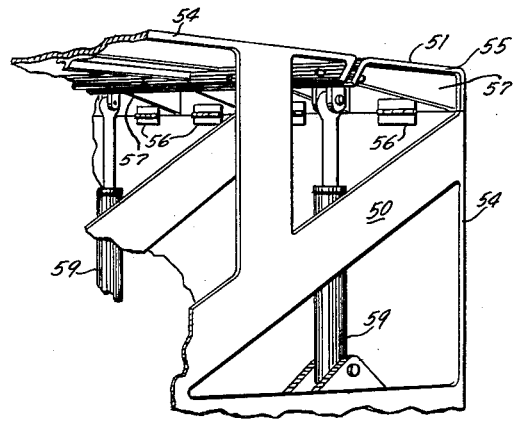
Fig. 4
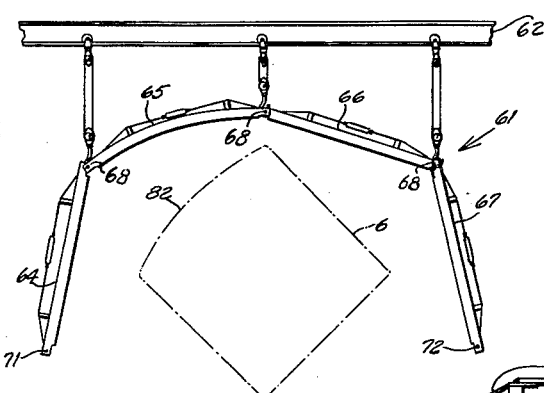
Fig. 5
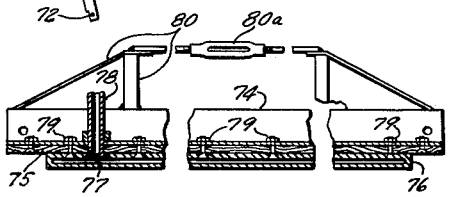
Fig. 6
Fig. 7
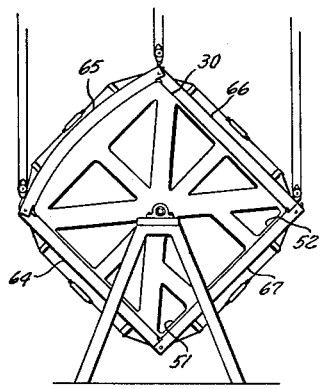
Fig. 8
INVENTOR.
WILLIAM B. WILKINS
BY
ATTORNEY Sept. 7, 1965 W. B. WILKINS 3,205,108
METHOD AND APPARATUS FOR MAKING WOUND TUBULAR ARTICLES
OF VARYING CROSS-SECTION
Filed May 17, 1962 3 Sheets-Sheet 3

INVENTOR.
WILLIAM B. WILKINS
BY
*Henry Kozak*
ATTORNEY

United States Patent Office 3,205,108
Patented Sept. 7, 1965

3,205,108
METHOD AND APPARATUS FOR MAKING WOUND TUBULAR ARTICLES OF VARYING CROSS-SECTION
William B. Wilkins, Roxboro, N.C., assignor, by mesne assignments, to National Castings Company, Cleveland, Ohio, a corporation of Ohio
Filed May 17, 1962, Ser. No. 195,521
15 Claims. (Cl. 156—189)

This invention relates to the manufacturing of large tubular receptacles by the wrapping of continuous thin sheet materials into a band-like wall of superimposed laminae or plies. Of particular interest is the formation of tubular walls, usually of approximately square or rectangular cross section, suitable for use in cargo containers, highway truck bodies or as building components, etc.

Efforts made heretofore in producing tubular articles wound from sheet materials have been confined in general to pipes or tubes of relatively small circular cross section such as those intended for use as conduits. In attempting to construct larger articles, especially non-circular shapes, by the methods used in manufacturing small types of tubes, difficulty is experienced particularly in attaining uniformity of tension between the outer and inner laminae and an absence of stickiness in the inner laminae. Overcoming this difficulty is an important factor in effecting good adhesion of the laminae and a unified wall in which all laminae contribute to total rigidity and strength of the wall.

A primary object of this invention is to provide a method, an apparatus for producing large size non-circular as well as circular tubular shapes wound from sheet materials.

Another object is to provide large band-like laminated structures of which substantially all laminae are slack-free and hence in a condition conducive to obtaining proper functioning of an adhesive carried by the laminae in response to application of pressure and heat.

These and other objects are accomplished by apparatus and method whereof an essential part of the apparatus contributed to the art by this invention is a mandrel having one or more outwardly convex peripheral sections in hinged relation with respective adjacent non-retractable peripheral sections. The retractable sections are movable inwardly from outward positions wherein they complete the outward periphery of the mandrel. Power means is included in the mandrel for reacting between a fixed portion of the mandrel and any retractable section for forcing or jacking such retractable section into its outer position when desired.

The method of the invention includes the steps of drawing a continuous sheet of paper or other flexible thin sheet material onto the mandrel through preconditioning equipment, such as an adhesive applicator, by rotation of the mandrel. The sheet is wound under such tension with the retractable sections withdrawn to dispose the sheet in superimposed laminae about the mandrel tautly across the gap between non-retractable sections left by a retracted section. Thereafter, the retractable section is forced into its outer position to stretch the laminated wall and thereby eliminate slack from the individual laminae. The wall, while thus stretched, is subjected to a pressure applying step, accompanied, if desired, by heating the laminated wall, and performed by a mold conforming to the outer surface of the mandrel-supported wrapped article to effect bonding of the laminae.

In the drawing with respect to which this invention is described in detail:

FIG. 4 is a fragmentary perspective of a corner portion of the mandrel of the previous figures illustrating a retractable corner section and actuating jacks therefor.

FIG. 5 is an elevation illustrating, in a storage position, a female mold apparatus in conjunction with the outline of the mandrel previous figures.

FIG. 6 is a longitudinal view of a pin used to connect uncoupled ends of sections of the mold shown in FIG. 5.

FIG. 7 is a longitudinal vertical cross section of one of the mold sections of FIG. 5.

FIG. 8 is an elevation showing the mold in FIG. 5 in an operative position about the mandrel.

Figure 1:
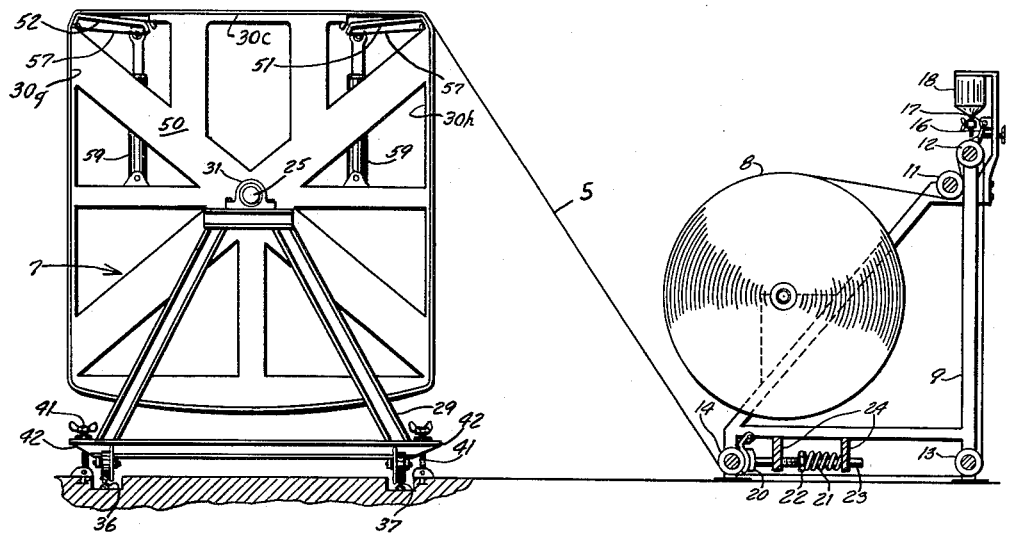
FIG. 1 is a schematic elevation of apparatus for wrapping laminated tubular walls.

Using paper as exemplary of a primary fabricating material for a tubular wall 6 to be formed on a mandrel 7, a continuous sheet of paper 5 is drawn from a supply roll 8 supported by a frame 9 as shown schematically in FIG. 1. In preparation for being wrapped onto the mandrel 7, the paper is led around a series of rolls 11, 12, 13, and 14 which permit the paper to be properly aligned, smoothed, and tensioned for satisfactory passage onto the mandrel. A doctor blade 16 extends downwardly from its supporting shaft 17 into close proximity with the entire length of the roll 12 to form a shed in which is maintained a liquid adhesive composition supplied from a tank 18 and applied to the paper as a thin film. As shown, the doctor blade and the tank are supported by an extension of the frame 9. Wrapping tension is produced in the paper as it is drawn through the system through forced rotation of the mandrel by a conventional braking device, such as a brake 20 mounted on the frame 9 to frictionally engage the roll 14. The pressure of the brake may be adjusted, for example, by increasing or decreasing the compression in a spring 21 through adjustment of a nut 22 lengthwise of a push rod 23 slidably supported by frame bracket 24. The tension in the paper may also be partially or wholly effected through "drag" imposed on the precedent rolls 11, 12, and 13. Usually, it is desirable to develop some of the paper tension at these latter rolls, e.g., by tightness of the bearings at the roll trunnions.

Figure 2:
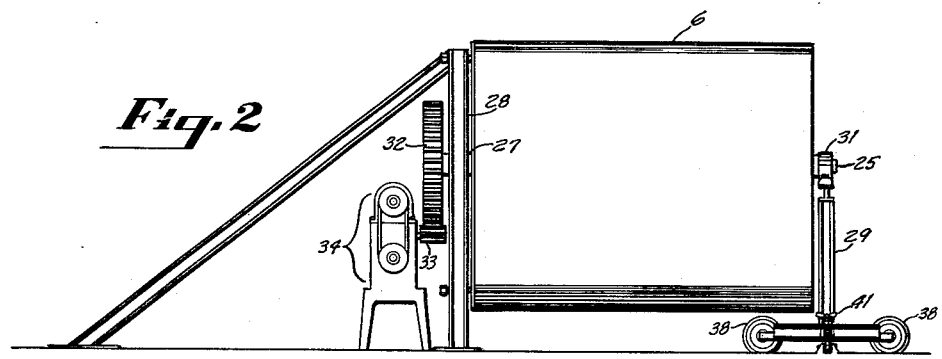
FIG. 2 is a longitudinal elevation of a mandrel and supporting and driving apparatus therefor illustrated in FIG. 1.
Figure 3:
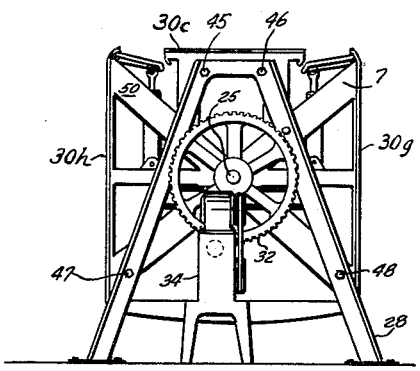
FIG. 3 is an end elevation of the apparatus of FIG. 2 with the driving and supporting mechanisms in the foreground.

As shown in FIGS. 1, 2 and 3 the mandrel has a central, longitudinal axle 25 providing journals disposed outwardly of both ends of the mandrel: One journal is in a bearing 27 mounted in a tripod frame 28. The other journal extends through a bearing 31 mounted on a mobile, track-supported A frame 29.

The frame 28 is fixed relative to the ground or floor and located at the wrapping site for simplification of a driving system comprising a ring gear 32, a pinion 33, and a motoring gear reduction unit 34.

To enable removal of the wall 6 from a peripheral wall 30 of the mandrel, and in view of the fixed location of the driving and mandrel-supporting means at one end of the mandrel, it is necessary to separate the frame 29 and the associated bearing 31 from the mandrel shaft in some manner providing such clearance as to permit transfer of the full length of the wall 6 out of longitudinal overlapping relation with the mandrel 7. As one arrangement for accomplishing this purpose, the frame 29 is supported on a pair of tracks 36 and 37 which receive flanged wheels 38 of the carriage portion of the frame 29. Because of the tension exerted in the paper 5 acting on the mandrel and the paper-supply system, the frame is subjected to substantial forces requiring it to be temporarily anchored to the floor. Tie down means, such as eyebolts 41 are attached to the floor for connection with bifurcate frame portions 42 as shown in FIG. 1. When the wall is to be removed from the mandrel, the bolts 41 are detached from the frame to allow transfer of the frame away from the mandrel.

To facilitate cantilever support of the mandrel 7 from the frame 28 when the frame 29 does not share support of the mandrel, the frame 28 comprises means, such as bolts 45, 46, 47, 48, in threaded relation with the two legs of the frame in a vertical plane adjacent the mandrel. When the mandrel is in the position shown in FIGS. 3, 9, and 10, threaded holes in the end of the mandrel are in registry with the bolts 45, 46 which may then be screwed into the mandrel. When this has been done, the lower bolts 47 and 48 are screwed into firmly abutting relation with an opposing end surface of the mandrel. These four bolts, of which bolts 45, 46 are in tension and bolts 47 and 48 are in compression, thereupon provide full cantilever support of the mandrel without any stresses imposed on the axle 25 or the driving mechanism for the mandrel. When thus supported, the mandrel is in a condition for detachment of the frame 29 and the associated bearing 31 from its journal at the opposite end.

A typical mandrel in accordance with this invention will have a generally rectangular cross section perpendicular to its axis, i.e., the axis of the axle 25, and an axial wall-forming length of, e.g., 10 feet. This length is merely exemplary since greater or lesser lengths may be used in accordance with the type of products desired.

The mandrel 7 is of sturdy construction in order to resist collapse during at least 2 manufacturing steps of the wall. As shown in FIGS. 1, 3, 7, and 10, both ends of the mandrel terminate in frames 50 of spider design. The mandrel further comprises similar frames spaced longitudinally and internally of the mandrel, e.g., 24 inches apart. The peripheries of these frames are attached as by welding to the peripheral steel-plate wall 54 of the mandrel. This steel plate, e.g., 3/16 inch thick, forms a continuous peripheral surface of the mandrel except for a pair of retractable mandrel sections 51 and 52. Preferably, the outer skin of the retractable sections is formed, as shown, of a similar plate material 55. When these sections are positioned, as shown in FIG. 8, during the adhesive curing stage, the outer surface of the mandrel is substantially continuous and arranged for shaping the interior surface of the wall 6.

In a mandrel of rectangular cross section, the retractable sections 51 and 52 necessarily constitute outwardly convex corner portions of the mandrel in order to have the outer convexity necessary to achieve the wall stretching following the wrapping operation. These sections are hinged in respect to adjacent fixed and relatively spaced sections as shown most clearly in FIG. 4 wherein the outer skin or plate 55 of the section 51 is attached to the corresponding plate 54 of the adjacent fixed wall section by a series of door type hinges 56. The axis for these hinges extends approximately within the planes of the plates 54 and 55 in order to obtain effective pivoting of the retractable section out of its outward position. The retractable sections are strongly reinforced by webs 57.

When either section 51 or 52 is retracted out of its outward position, it leaves a gap between the adjacent fixed sections of the mandrel. This gap extends lengthwise of the mandrel 7. As shown, the fixed mandrel sections adjacent to a pivotable section 51 or 52 are flat and extend in planes which meet in a dihedral angle in the region occupied by the pivotable section in its outward position. The mandrel wall 30 thus comprises three fixed sections, 30h, 30c, and 30g, spaced to form a gap in two adjacent corners of the mandrel which are closed by the pivotal sections 51, 52 at outward positions.

Figure 10:
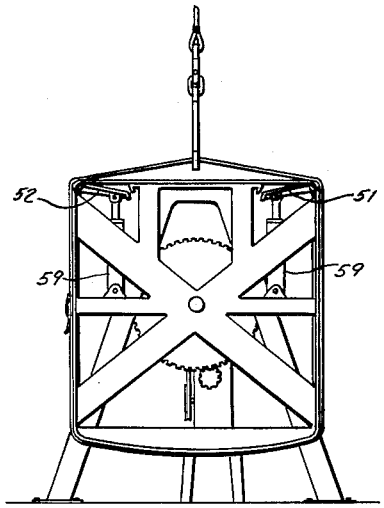
FIG. 10 is an end elevation of the tubular wall and equipment shown in FIG. 9.

To support the retractable sections in their various operative positions, and especially to force them to their outward positions as shown in FIGS. 4 and 8, the mandrel comprises power means, such as the jacks 59. In order to avoid cumbersome mandrel construction, it is preferred to use a plurality of such jacks spaced, e.g., 24 inches apart. These jacks are, in the present embodiment, of the hydraulic, single-action, spring-return type operated from a common hydraulic system. They are mounted between a fixed portion of the mandrel and respective pivotable sections 51 or 52 for spring return to the retracted position as shown in FIGS. 1 and 10. These jacks, when used in mandrels of the dimensions herein indicated, will be of a capacity on the order of twenty tons each.

FIG. 5 illustrates a pressure molding apparatus, i.e., a molding shroud 61, suitable for being folded about the outer surface of the tubular wall 6 when supported on the mandrel 7. Shroud 61 is shown suspended by a plurality of block and tackles from a girder 62 in superimposed relation with the wall 6 as represented in dot-dash outline. As shown, the shroud comprises four sections 64, 65, 66, and 67 connected in serially hinged relationship. The frames of each section are apertured to receive a hinge pin, such as the pin 68 shown in FIG. 6. The pin 68 is also adapted for connecting the free ends of sections 64 and 67 when respective apertures 71 and 72 are brought into registry. This places the four mold sections in serially continuous relationship as shown in FIG. 8.

In view of the relatively hinged relationship of the various sections, it is preferably to construct the sections with separate pressure chambers. This may be achieved as shown in FIG. 7 wherein each section comprises primary frame members or beams 74 for backing and reinforcing a backing plate 75 on which is mounted a pressure chamber 76 as shown and employed in the practice of the invention. The pressure chamber consists of walls of light gage steel plate which are separable but may be arranged with practically no clearance between them at the deflated condition of the pressure chamber. A fluid supply duct 77 extends through the wall of the chamber 76 disposed against the backing plate 75, and through the latter into connection with other supply means such as a flexible hose 78. Studs 79 secured to the above-mentioned wall of the pressure chamber attach the chamber 76 to the backing plate 75. Each section also comprises reinforcement or truss structure 80 including a turnbuckle 80a. Desired adjustment of the turnbuckle 80a is difficult to obtain before actual use. Preferably, the turnbuckles of each section are adjusted progressively through a gradual increase of curing pressure to settings consistent with a desired manufacturing procedure.

The molding apparatus 61 is suitable for use for molding operations which involve merely application of pressure since many curing procedures may be accomplished at room temperatures without heat application. This apparatus is also adapted for effecting a curing cycle involving the application of heat as well as pressure since the pressure chambers 76 are suitable for receiving steam or other heated fluid. Also to be noted is that section 65 presents a concave surface to the mandrel or walls 6 wrapped thereon corresponding to the convex surface 82.

In a typical manufacturing procedure, construction of the wall 6 is commenced by clamping or taping side edges of a leading portion of a continuous paper sheet 5 to side edges of the peripheral plate 54, 55 of the mandrel. Securing of the leading edge of the paper sheet to longitudinally intermediate portions of the mandrel is avoided since it hampers removal of the wall 6 from the mandrel at completion of wrapping and curing. Rotation of the mandrel is commenced with a pool of liquid adhesive confined in the pocket or shed between the doctor blade 16 and the roll 12. The mandrel sections 51 and 52 are retracted. The rate of rotation is e.g., one revolution per minute and equivalent to approximately 33 feet per minute. Speeds up to 100 feet per minute have been used with reasonably satisfactory results. The paper is tensioned short of its tear strength sufficiently by means such as the brake 20 to dispose each wrap in taut planate condition over the subtending wrap. When paper of grade 92 pounds per 1,000 square feet, e.g., "Bottlemaster" containing melamine as a moisture proofing agent, manufactured by the Mead Paper Corporation is used, winding may be terminated at thirty wraps to yield a wall of ¾ inch in thickness. The paper is then severed adjacent the mandrel from connection with its supply system.

The uncured wall of wrapped paper, at this stage, extends across the gaps in the mandrel wall left by the retracted mandrel corner sections 51 and 52. The latter are now jacked into their outward positions through operation of the jacks 59 to force that portion of the paper wall in contact therewith into conformity with the desired inner contour of the wall 6 and the completed and entire outer contour of the mandrel 7. With mandrel sections 51 and 52 functioning as supports in their outward positions for portions of the wrapped paper wall previously stretched across the gaps, the wall as a whole is stretched in a manner such as to place substantially all laminae thereof under tension. The container wall is now in a desired prestressed condition adapting it for curing of the adhesive carried therein.

The next step of the process is the curing of the wall 6 to activate the adhesive whereby adjacent laminae are joined throughout the thickness of the wall, i.e., to join the adhesive carrying side of each lamina to the untreated side of the next adjacent lamina. In using a low-viscosity, uncured urea formaldehyde composition of approximately 60% solids as an adhesive, pressure is essential. Heating may be provided in accordance with the speed of curing desired. To this end, the mold 61 is lowered into place around the wall 6 as supported on the mandrel 7 and connected as shown in FIG. 8. Pressure in each of the same magnitude, e.g., 20 pounds per square inch, is obtained in each mold section from a pressure source connected with each mold section in the manner shown in FIG. 7. When curing at room temperature is contemplated, the source of pressure may be compressed air. At room temperatures, substantial curing of the wall is obtained in 24 hours of pressure application with the use of an accelerator, e.g., ammonium chloride amounting to about 2% by weight of the weight of the adhesive composition. With the same accelerator the curing time may be reduced to about 30 minutes through the application of heat by the passage of hot water at 200° F. through the mold 61. In this latter event, an outlet (not shown) similar to the inlet 77 is provided at the opposite end or other remote portions of the mold section. Additional heating of the outer shell of the mandrel may be obtained by a means, such as conventional electric heating elements (not shown) attached to the inner surface of the plates 54, 55.

Figure 9:
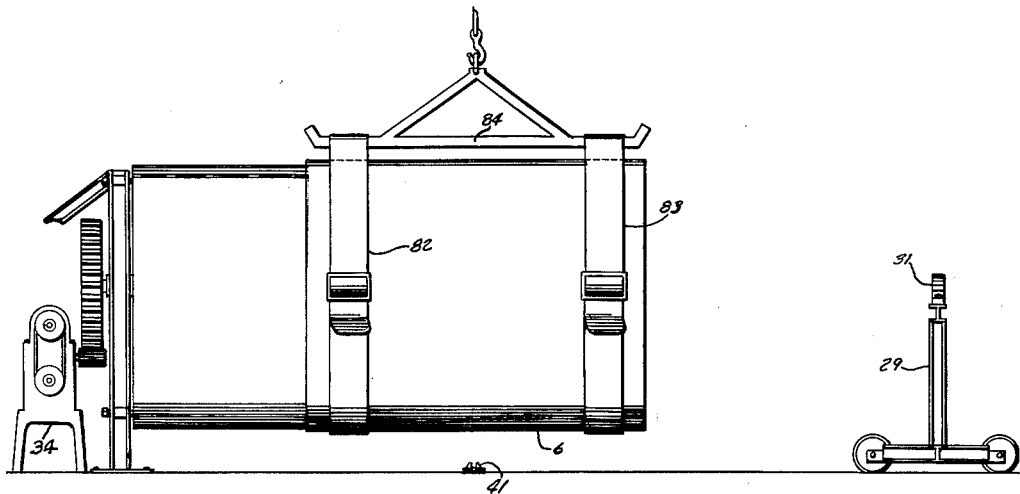
FIG. 9 is a longitudinal elevation showing a completed tubular wall at intermediate stage of removal from the mandrel and associated apparatuses of previous figures.

After curing the wall 6, preparation for removal proceeds with retraction of the mandrel sections 51 and 52 to the position shown in FIGS. 3 and 10 through contraction of the jacks 59. Thereafter, the wall 6 is broken loose from the mandrel by pressing against the corner sections of the wall previously supported by mandrel sections 51 and 52. Pressure is exerted primarily in directions parallel to the length of the jacks 59. Disengagement of these relatively small sections 51, 52 of the mandrel with the inner surface of the wall is sufficient to permit endwise movement of the wall from the mandrel. However, before such movement can be effected, the upper bolts 45, 46, carried by the frame 28, are screwed into the driven end of the mandrel. The lower bolts 47, 48 are adjusted against the mandrel in a manner mentioned hereinabove. Thereafter, the frame 29 and associated bearing 31 are transferred lengthwise of the track (rails 36, 37) for a distance at least equal to that of the wall 6 as illustrated in FIG. 9. In removing wall 6 from the mandrel, the wall may be supported, e.g., from a crane by a sling comprising straps 82 and 83 looped over a yoke 84. The wall section is thereupon removed readily by movement of the supporting crane (not shown) in a direction parallel with the mandrel axis accompanied usually by some manual manipulation of the wall to work it free of the mandrel.

The wall 6 thus produced may be regarded as a product susceptible of many different uses depending upon the components which may be added to it to provide a cargo container, a boating unit, a portable building, a fall-out shelter, or other article.

The terms and expressions which have been employed are used as terms of description and not of limitation and there is no intention of excluding such equivalents of the invention described or portions thereof as fall within the scope of the claims.

What is claimed is:

1. In a method of manufacturing a tubular wall, the steps of:
    (a) wrapping a thin flexible sheet material of continuous length about a support to superimpose successive wraps tightly over preceding wraps in the form of a laminated tubular wall;
    (b) supporting the entire inner surface of said wall by said support except for a gap in the support between portions which if projected would meet in a dihedral angle extending lengthwise of the support;
    (c) after completion of the wrapping step, supporting the entire interior surface of that portion of the wall bridging said gap while conforming to a desired concavo-convex contour to complete the inner contour of the wall; and
    (d) subjecting the laminated product to a laminae-bonding treatment which includes application of pressure to substantially the entire exterior surface of said product while supported by the supports.

2. The method of claim 1 for manufacturing a tubular wall, including the steps of:
    (a) applying a heat sensitive adhesive to said sheet material prior to the wrapping step; and
    (b) heating the wall as a part of said bonding treatment.

3. The method of manufacturing a tubular wall in accordance with claim 1, including the steps of:
    (a) disengaging said support for forming said concavo-convex portion of the wall to loosen the wall with respect to the other support to enable removal of the wall therefrom.

4. In a method of manufacturing a tubular wall, the steps of:
    (a) wrapping a thin flexible-sheet material of continuous length about a support to superimpose successive wraps tightly over preceding wraps in the form of a laminated tubular wall;
    (b) supporting the entire inner surface of said wall by said support except for at least one gap in the support between portions thereof which if projected would meet in a dihedral angle extending lengthwise of the support;
    (c) after completion of the wrapping step, forcing another support into said gap against the interior surface of the wall to tension all of the laminae and to complete the inner contour of the wall; and
    (d) subjecting the laminated product to a laminae-bonding treatment including application of pressure to substantially the entire peripheral exterior surface of said product while supported by both supports.

5. In a method of manufacturing a tubular wall, the steps of:
    (a) providing a mandrel having an inwardly-retractable, outwardly-convex, periphery-forming section in movable relation with an adjacent fixed periphery-forming section of the mandrel;
(b) rotating the mandrel with said retractable section swung inwardly to wrap a continuous thin sheet material onto the mandrel in series of tightly superimposed wraps to form a laminated tubular product;
(c) jacking the retractable section into a position within the substantially continuous exterior outline of the mandrel; and
(d) subjecting the laminated product to a laminae-bonding treatment including the application of substantially uniform pressure to substantially the entire exterior surface of said product while supported on the mandrel.

6. The method of manufacturing a tubular wall of claim 5 including the steps of:
(a) applying a heat-sensitive adhesive to the sheet material prior to the wrapping step; and
(b) heating the wall as a part of said bonding treatment.

7. In a method of manufacturing a tubular wall, the steps of:
(a) providing a mandrel having a peripheral contour complementary to a desired inner surface for said wall defined in part by a section of fixed position within said contour and a retractable section of outwardly convex surface in movable relation to said fixed section and adapted to define an arcuate portion of said contour;
(b) rotating the mandrel with said retractable section withdrawn inwardly of said contour with respect to a supply of thin flexible sheet material of continuous length to wrap said material under a condition of tension onto the mandrel into said wall as a plurality of superimposed laminae;
(c) forcing the retractable section against said wall until said convex surface conforms with said contour;
(d) while supported on the mandrel, subjecting the wall to a bonding treatment including the application of substantially uniform pressure to the entire exterior surface of said wall; and
(e) retracting the retractable section inwardly of said contour for removing the wall from the mandrel.

8. In a method of manufacturing a tubular wall, of generally rectangular shape the steps of:
(a) providing a mandrel having a peripheral contour of generally rectangular shape and relatively rigid supporting surfaces except for two adjacent corner sections which are separately swingable with respect to the rest of the mandrel inwardly thereof out of positions conforming to the inner ultimate contour of the wall;
(b) rotating of the mandrel with said corner sections withdrawn inwardly relative to said contour with respect to a supply of thin, flexible sheet material of continuous length under a condition of tension onto the mandrel as a plurality of superimposed laminae to form said wall;
(c) forcing the retracted sections against said wall to effect said contour;
(d) while supported on the mandrel, subjecting the wall to a bonding treatment including application of substantially uniform pressure to the entire exterior surface of the wall; and
(e) retracting said corner sections inwardly of said contour to permit removal of the wall from the mandrel.

9. A method of manufacturing a tubular wall providing the top, bottom, and sides of a cargo container of cargo vehicle body proportions, the steps of:
(a) wrapping a continuous sheet of paper over a generally rectangular support at tension short of the tear strength of the paper to superimpose successive wraps over preceding wraps;
(b) supporting during the wrapping step the entire inner surface of said wall by the support except for a gap in at least one corner of the support between portions thereof which if projected would meet in a dihedral angle extending lengthwise of the support;
(c) after completion of the wrapping step, forcing another support adapted to complete the inner contour of that portion of the wall stretched across said gap against said wall portion to tension substantially all of the laminae and to complete the inner contour of the wall;
(d) subjecting the wrapped product to a laminae-bonding treatment including the application of pressure to substantially the entire outer surface of said product while supported by both supports;
(e) retracting the second-named support from contact with the wall to release the wall from tightening engagement with the first named support; and
(f) removing the wall from the first-named support.

10. A mandrel for wrapping a sheet material into a laminated tubular product comprising:
(a) means in concentric relation with an axis of rotation for said mandrel for rotatably connecting the mandrel with a support therefor; and
(b) a wall having a polygonal substantially-continuous cross section in centered perpendicular relation with said axis;
said wall comprising a corner section between two fixed side sections in hinged relation with one of the fixed sections along an axis extending lengthwise of said axis and swingable inwardly of said cross section.

11. A mandrel for wrapping a sheet material into a laminated tubular product comprising:
(a) means in concentric relation with an axis of rotation for said mandrel for rotatable connection with a support for the mandrel;
(b) a wall of polygonal substantially continuous cross section of centered perpendicular relation with said axis;
(c) said wall comprising two fixed sections spaced to form a gap in each of two adjacent corners of said wall; and
(d) a movable section for each gap in hinged relation with an adjacent fixed section movable inwardly from a position in which it completes the polygonal shape of the mandrel.

12. A mandrel for wrapping a sheet material into a polygonal laminated tubular product comprising:
(a) means in concentric relation with an axis of rotation for the mandrel adapting the mandrel for rotatable connection with a support therefor;
(b) a wall of substantially continuous cross section centered about said axis, said wall comprising,
(1) two fixed sections separated by a gap extending lengthwise of the mandrel, the outer surfaces of said sections extending towards said gap in planes forming a dihedral angle,
(2) an outwardly convex section hinged to one of said fixed sections for movement between an outward position, in said gap to complete a polygonal shape of said mandrel, and a position inwardly of the mandrel; and
(c) power means mounted between a fixed portion of a mandrel and said convex section for forcibly moving the convex section from its outward position of said positions to the other.

13. A mandrel for wrapping sheet material into a laminated tubular product comprising:
(a) means in concentric relation with an axis of rotation for said mandrel for rotatable connection with a support for the mandrel;
(b) a wall of polygonal, substantially continuous cross section in centered prependicular relation with said axis;

(c) said wall comprising three fixed sections spaced to form a gap in each of two adjacent corners of said wall; and
(d) a movable section for each gap in hinged relation with an adjacent fixed section movable inwardly from a position in which it completes the polygonal shape of the mandrel.

14. An apparatus for making a laminated tubular product:
(a) a mandrel for wrapping a sheet material into a plurality of laminae about itself comprising,
  (1) means in concentric relation with an axis of rotation for said mandrel for connecting the mandrel in rotatable relationship with a support,
  (2) a wall of polygonal substantially continuous cross section with the plane of cross section in centered perpendicular relation with said axis,
  (3) said wall comprising a corner section disposed between fixed side sections and in hinged relation with one of the fixed sections along an axis extending lengthwise of said axis and swingable inwardly of said cross section; and
(b) a molding shroud comprising relatively hinged sections corresponding to the sides of the mandrel, the inner surfaces of said shroud having a periphery at clearance with the mandrel conforming to a desired outer perimeter of said product,
  (1) each of said shroud sections comprising a rigid frame work mounting a pressure chamber defining said inner surface.

15. An apparatus for making a laminated tubular product:
(a) a mandrel for wrapping a sheet material into a plurality of laminae about itself comprising,
  (1) an internal frame work including journals projecting beyond both ends of the mandrel in concentricity with axis of rotation therefor,
  (2) a wall of polygonal substantially continuous cross section attached to said framework with its plane of cross section in generally centered perpendicular relation with said axis,
  (3) said wall comprising a corner section disposed between fixed side sections and in hinged relation with other of the fixed sections along an axis extending lengthwise of said axis and swingable inwardly of said framework;
(b) a support of fixed position including,
  (1) bearing means for receiving one of said journals, and
  (2) means for attaching the mandrel thereto in cantilever relationship;
(c) a movable support having bearing means for receiving the other journal; and
(d) means for securing the movable support to a base in fixed relation with said fixed support.

References Cited by the Examiner

UNITED STATES PATENTS

| | | | |
|---|---|---|---|
| 2,034,731 | 3/36 | Saalbach | 156—443 XR |
| 2,388,541 | 11/45 | Henderson | 156—189 |
| 2,814,329 | 11/57 | Sitton | 156—189 |

EARL M. BERGERT, *Primary Examiner.*